(12) United States Patent
Ryoo et al.

(10) Patent No.: US 6,585,948 B1
(45) Date of Patent: Jul. 1, 2003

(54) CARBON MOLECULAR SIEVE MATERIAL WITH STRUCTURAL REGULARITY, METHOD FOR PREPARING THE SAME AND USE THEREOF

(75) Inventors: Ryong Ryoo, Taejon (KR); Shinae Jun, Jejudo (KR); Sang Hoon Joo, Kyunggido (KR); Chang Hyun Ko, Taejon (KR)

(73) Assignee: Korea Advanced Institute of Science, Taejon (KR)

( * ) Notice: Subject to any disclaimer, the term of this patent is extended or adjusted under 35 U.S.C. 154(b) by 24 days.

(21) Appl. No.: 09/626,947

(22) Filed: Jul. 27, 2000

(51) Int. Cl.[7] .............................................. C01G 31/02
(52) U.S. Cl. ................... 423/445 R; 502/418; 502/423; 502/437
(58) Field of Search ................................ 502/418, 423, 502/437, 412, 180, 182, 183, 184, 185; 423/445 R (56) References Cited

U.S. PATENT DOCUMENTS

| | | | | |
|---|---|---|---|---|
| 4,206,078 A | * | 6/1980 | Ohorodnik et al. | 502/181 |
| 4,263,268 A | * | 4/1981 | Knox et al. | 423/445 R |
| 4,499,201 A | * | 2/1985 | Leyerle | 502/180 |
| 5,057,296 A | | 10/1991 | Beck | 423/277 |
| 5,102,643 A | | 4/1992 | Kresge et al. | 423/328 |
| 5,942,208 A | | 8/1999 | Ryoo et al. | 423/705 |
| 5,958,368 A | | 9/1999 | Ryoo et al. | 423/705 |

OTHER PUBLICATIONS

Ryoo et al., "Generalized route to the preparation of mesoporous metallosilicates via post–synthetic metal implantation", *Chem. Commun.*, pp. 2225–2226 (1997).
Kim and Ryoo, "Synthesis and Pore Size Control of Cubic Mesoporous Silica SBA–1", *Chem. Mater.*, 11:487–491 (1999).
Kim et al., "Synthesis of MCM–48 single crystals", *Chem. Commun.*, pp. 259–260 (1998).

* cited by examiner

*Primary Examiner*—Stuart L. Hendrickson
(74) *Attorney, Agent, or Firm*—Drinker Biddle & Reath LLP (57) ABSTRACT

Disclosed is a carbon molecular sieve material. It is prepared by a method comprising the step of adsorbing a mixture of an aqueous carbohydrate solution and an acid or a polymer precursor into pores of an inorganic molecular sieve material; drying and polymerizing the adsorbates; re-adsorbing a mixture of an aqueous carbohydrate solution and an acid or a polymer precursor onto the resultant mixture obtained in the previous steps, and drying and polymerizing the adsorbates; carbonizing the adsorbates through thermal decomposition; and removing the framework of the inorganic molecular sieve from the carbonized adsorbates by use of a fluoric acid or a sodium hydroxide solution. With uniformity in pore size and regularity in structure, the carbon molecular sieve is suitable for use in catalysts, adsorbents, supports, sensors, electrodes, etc.

11 Claims, 5 Drawing Sheets

Pore size (nm)

CARBON MOLECULAR SIEVE MATERIAL WITH STRUCTURAL REGULARITY, METHOD FOR PREPARING THE SAME AND USE THEREOF

BACKGROUND OF THE INVENTION

1. Field of the invention

The present invention relates, in general, to a carbon molecular sieve material and, more particularly, to a carbon molecular sieve material with structural regularity, which is suitable for use in catalysts, adsorbents, carriers, sensors, and electrodes. Also, the present invention is concerned with a method for preparing such a carbon molecular sieve material. In addition, the present invention is directed to use of the carbon molecular sieve material.

2. Description of the Prior Art

Among porous materials, those having three-dimensionally arranged pores with uniform sizes, like zeolite, are defined as molecular sieves. Since the uniform pores make such molecular sieves be selective for specific sizes of molecules, they are extensively used as catalysts, catalyst supports, or adsorbents.

Compared with metal oxide type molecular sieves such as zeolite, carbon molecular sieves are found to have advantages in thermal stability, hydrothermal stability, chemical resistance and lipophilicity, and active research and development is directed to carbon molecular sieves.

Most of the carbon molecular sieves having been developed thus far are synthesized through the pyrolysis of natural vegetable materials such as coconut or synthetic polymers. Owing to higher sparsity of impurities such as metals or metal oxides, carbon molecular sieves are dominantly prepared from synthetic polymers. Such carbon molecular sieves are, for the most part, 0.5 nm or less in pore size. By controlling the thermal decomposition temperatures or by an after-treatment with oxygen, their pore sizes can be increased, but to a limited degree.

In the meanwhile, there has been made many efforts to synthesize carbon sieves by selectively adsorbing polymers or propylene gas onto active carbon and decomposing them. The resultant materials have relatively uniform distribution in pore size compared with the active carbon, so that they show properties of molecular sieves. However, because of the absence of regularity in their whole structures, the X-ray diffraction patterns of the above materials are close to those of amorphous carbons. In addition, the techniques suffer from disadvantages in that conditions for the adsorption and decomposition are quite stringent.

In adsorption and separation functions, conventional carbon molecular sieves having developed thus far are restrained to small molecules. For instance, they have been used as adsorbents for storing small molecules such as hydrogen and methane or to separate nitrogen or oxygen from the air.

Recently, a group of researchers at Mobil Co. reported a series of mesoporous molecular sieves, named the M41S series, including MCM-41 and MCM-48 as disclosed in U.S. Pat. Nos. 5,057,296 and 5,102,643. Since then, various mesoporous molecular sieves, such as SBA-1, SBA-15, KIT-1 and MSU-1, have been developed.

Ranging, in pore size, from 2 to 30 nm, mesoporous molecular sieves are synthesized through a liquid crystal template pathway by using surfactants as templates. These mesoporous molecular sieves have advantages in that their pore sizes can be adjusted in a range of 1.6 to 30 nm by controlling the kinds of surfactants or synthetic conditions employed during the production process. Further, they can be synthesized to have various structures by virtue of the versatility of the templates. In past, research was made on template techniques in which various organic materials were filled within the pores of zeolite and thermally decomposed, followed by removing the silica framework to produce carbon molecular sieves. However, such techniques are found to fail because, when the template zeolite is removed, the carbon structure does not stand by itself, but collapses.

SUMMARY OF THE INVENTION

Leading to the present invention, the intensive and thorough research on carbon molecular sieves, repeated by the present inventors aiming to overcome the above problems encountered in prior arts, resulted in the finding that specific inorganic mesoporous molecular sieves are useful as templates from which carbon molecular sieves can be synthesized with uniform pore sizes and structural regularity. Using a carbonization method of the present invention, there can be obtained carbon molecular sieves in which pores with uniform diameters are regularly arranged. Such materials with regularity can find numerous applications in catalyst supports, organic adsorbents, sensors, electrodes, etc.

Therefore, it is an object of the present invention to provide a method for preparing structurally regular carbon molecular sieves in which pores with uniform diameters are three-dimensionally arranged.

It is another object of the present invention to provide carbon molecular sieves with structural regularity.

It is another object of the present invention to provide use of the structurally regular carbon molecular sieves.

In accordance with the present invention, there is provided a method for preparing a carbon molecular sieve material comprising the steps of: adsorbing a mixture of an aqueous carbohydrate solution and an acid or a polymer precursor into pores of an inorganic molecular sieve material; drying and polymerizing the adsorbates; re-adsorbing a mixture of an aqueous carbohydrate solution and an acid or a polymer precursor onto the resultant mixture obtained in the previous steps, and drying and polymerizing the adsorbates; carbonizing the adsorbates through thermal decomposition; and removing the framework of the inorganic molecular sieve from the carbonized adsorbates by use of a hydrofluoric acid or a sodium hydroxide solution.

BRIEF DESCRIPTION OF THE DRAWINGS

The above and other objects, features and other advantages of the present invention will be more clearly understood from the following detailed description taken in conjunction with the accompanying drawings, in which:

FIG. 2 shows scanning electron micrographs of the MCM-48 used as a template (a) and the CMK-1 (b) obtained by removing the silica framework with NaOH after the thermal decomposition of sucrose in pores of the MCM-48;

DETAILED DESCRIPTION OF THE INVENTION

The present invention contemplates carbon molecular sieves with orderly arranged pores of uniform sizes, which are synthesized after removing templates of inorganic molecular sieves. Into inorganic molecular sieve pores is adsorbed an organic material or a polymer which is then polymerized under a catalytic action of an acid and thermally decomposed to form carbon. The silica framework of the inorganic molecular sieve is dissolved in a hydrofluoric acid or a sodium hydroxide solution leaving a carbon molecular sieve (hereinafter referred to as "CMK") with structural regularity.

First, a mixture of a carbohydrate solution and an acid or a precursor of polymer is adsorbed in a molecular sieve. Suitable as a molecular sieve are MCM-48 (Ia3d) and SBA-1 (Pn3m), each of which has a cubic structure in which channels are arranged three-dimensionally, and KIT-1 and MSU-1, each of which has three-dimensionally, disorderly channels. Also useful are various mesoporous molecular sieves such as SBA-15 (Zhao et al., Science, 1998, 279, 548.) in which one-dimensional channels are connected to each other via micropores. In the present invention, MCM-48 and SBA-1 are used as templates for synthesizing carbon molecular sieves which are named "CMK-1" and "CMK-2", respectively. MCM-48 can be prepared by the method of Kim et al., (Chem. Commun., 1998, 259) for its preparation and SBA-1 by the method of Kim and Ryoo (Chem, Mater., 1999, 11, 487).

Used as a source of the CMKs, carbohydrates are preferably exemplified by water-soluble monosaccharides, such as sucrose, xylose, glucose, etc., disaccharides and polysaccharides. In addition, organic precursor materials such as furfuryl alcohol and aniline, and gases such as acetylene and propylene may be useful as sources of the CMKs.

Preferably, the used amount of the organic material is as much as a carbon amount corresponding to the total pore volume of the inorganic molecular sieve. If the organic material is used at a larger amount, an amorphous carbon mass is formed. Usually, the amount of carbohydrates or organic materials necessary to fill pores of molecular sieves of 1 g is in the range of 0.1 to 3 g. When carbohydrates are to be dissolved in water for use, no limitation is imposed on the amount of water. However, too excessive an amount of water requires too long a period of time which it takes to dry the carbohydrates in a drying step, later. Accordingly, sufficient is an amount allowing to submerge the inorganic molecular sieves under water.

Any acid, if it can polymerize the hydrates or the polymer precursors, may be used in the present invention. Preferable is sulfuric acid, hydrochloric acid, nitric acid or phosphoric acid. In addition, solid acids which are prepared by charging aluminum into mesoporous molecular sieves may be used for this purpose. Sufficient is the minimal amount at which the acid is allowed to serve as a catalyst for condensing or polymerizing carbohydrates or organic materials.

Next, the organic materials adsorbed in the pores of the molecular sieves are dried and polymerized at an appropriate temperature for a predetermined period of time under an appropriate atmosphere.

In this step, the drying and polymerization is performed preferably at 50 to 400° C., to which it preferably takes five minutes to 24 hours to raise the reaction temperature. Depending on the adsorbed materials, the drying and polymerization may be performed in the air, under vacuum or in an oxygen-free atmosphere.

Afterwards, additional carbohydrates or polymer precursors are re-adsorbed into the molecular sieves having polymerized adsorbates, and dried and polymerized. This step, a repetition of the adsorbing and the drying and polymerizing steps, may be omitted depending on kinds of the mesoporous molecular sieves and the adsorbates.

Then, the adsorbates in the molecular sieves are thermally decomposed at an appropriate temperature for a predetermined period of time under a suitable atmosphere. In this regard, the thermal decomposition is preferably conducted at 500 to 1,200° C. to which it is preferable to raise the temperature within 1 to 24 hours. Also, the temperature is preferably maintained for 1 to 12 hours. By controlling the thermal decomposition temperature, the amount of the oxygen present on the surface of the CMK may be controlled. A vacuum or an oxygen-free atmosphere is suitable for the thermal decomposition.

Thereafter, the inorganic framework of the molecular sieves is removed from the carbonized mixture by use of a hydrofluoric acid or an aqueous sodium hydroxide solution to obtain desired carbon molecular sieves. For instance, when 1 g of an inorganic molecular sieve is used as a template to synthesize CMK, about 50 to 100 ml of an aqueous 10 wt % hydrofluoric solution or 30 to 60 ml of a 1M sodium hydroxide solution is preferably used. A smaller amount may not dissolve the inorganic framework of the template.

In the adsorbing and the re-adsorbing step, a mixture of an aqueous carbohydrate solution and an acid or polymer precursors are adsorbed along with a metal element selected from the group consisting of platinum, gold, palladium, ruthenium, molybdenum, and transition metals, so as to enhance the functionality of the molecular sieves. Likewise, a metal element selected from the group consisting of platinum, gold, palladium, ruthenium, molybdenum and transition metals may be adsorbed into pores of the carbon molecular sieves thus obtained.

In a view of structures, the CMK prepared according to the above-described procedure is inverse to the inorganic molecular sieves which serve as templates. Thus, the CMK can be versatile in structure and morphology in accordance with the templates.

Figure 1:
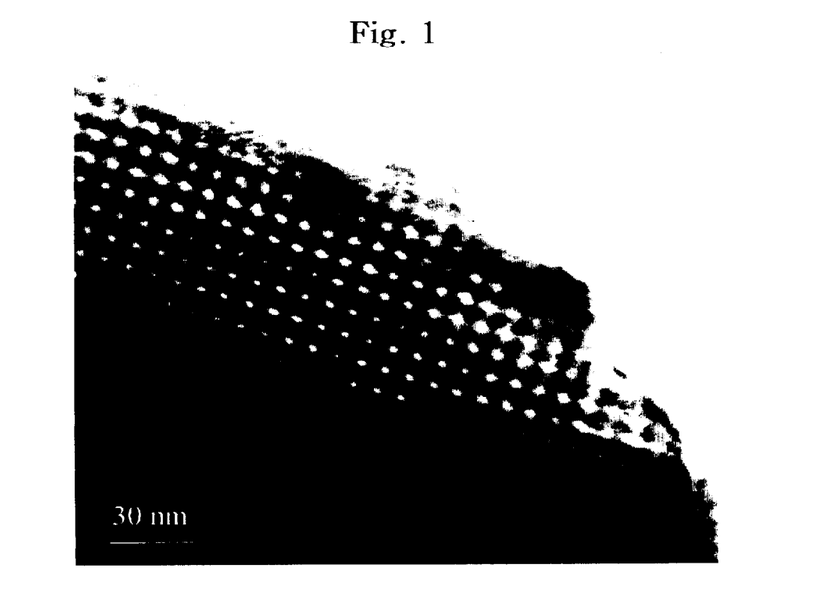
FIG. 1 is an electron micrograph of the carbon molecular sieve CMK-1 prepared using a mesoporous molecular sieve MCM-48 as a template according to an embodiment of the present invention.
Figure 2A:
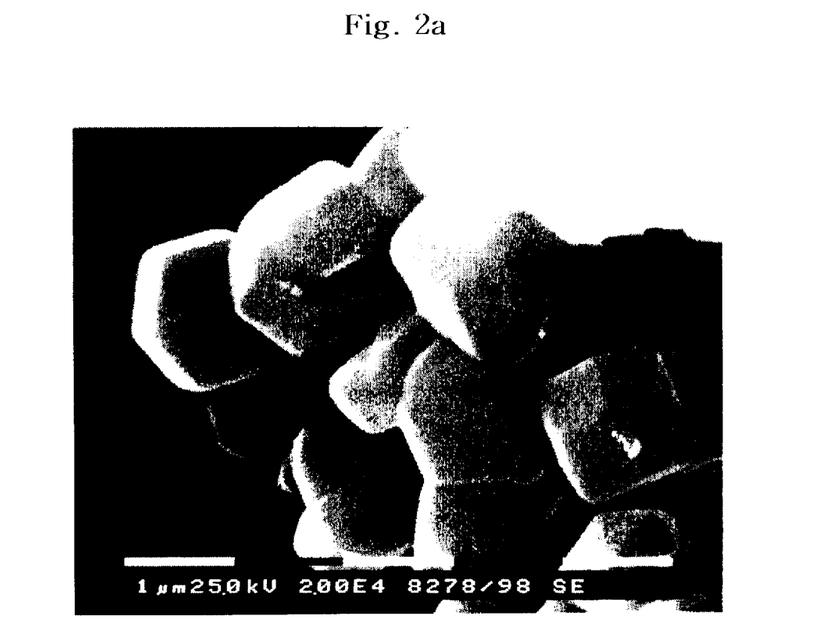
Figure 2B:
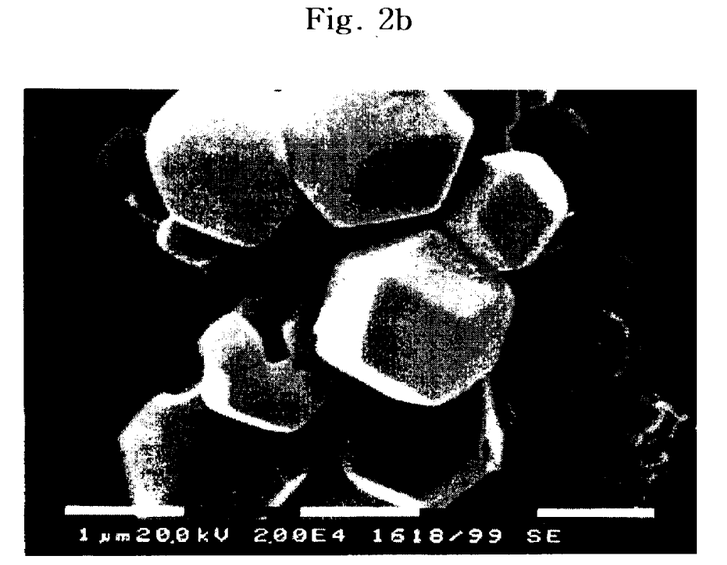

With reference to FIG. 1, there is an electron micrograph of the CMK-1, which is prepared from sucrose with MCM-48 serving as a template. As shown in FIG. 1, CMK-1 has a cubic structure in which carbon framework units are uniformly connected to one another on the whole. In addition, CMK-1 has pores which reflect the shapes of the template MCM-48 particles as they are. Scanning electron micrography is useful to recognize the conformational relation between the product and the template. FIGS. 2a and 2b are scanning electron microphotographs of MCM-48 and CMK-1, respectively. As seen, the truncated octahedral shapes of MCM-48 particles are maintained, as they are, in the structure of the CMK-1 after the template is removed.

Figure 3:
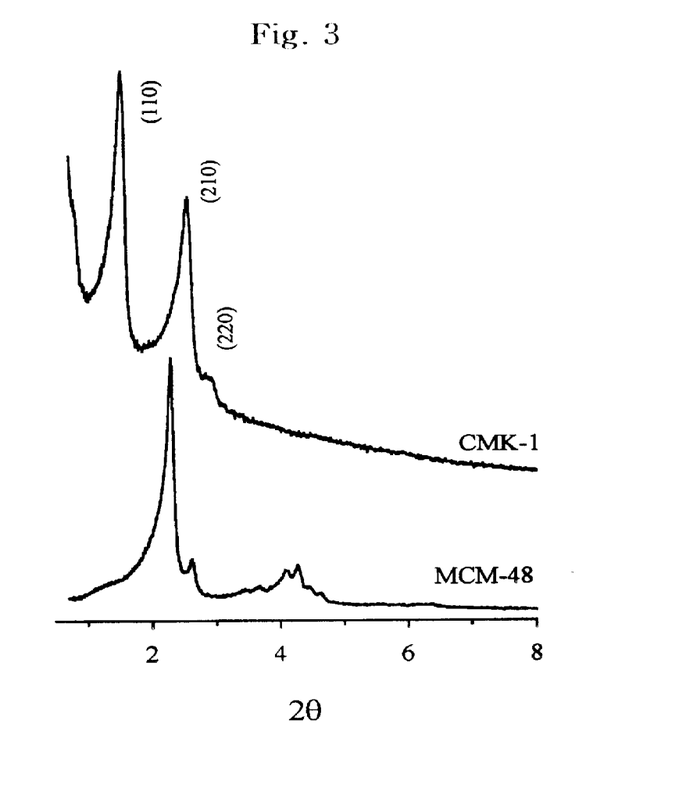
FIG. 3 shows X-ray diffraction patterns of MCM-48, used as a template and CMK-1, synthesized by use of MCM-48 as a template.

With reference to FIG. 3, there are X-ray diffraction analysis results of MCM-48, which served as a template, and CMK-1, which was patterned after the template. In the diffraction pattern of CMK-1, there appears a new peak corresponding to (110) diffraction of MCM-48, which is not symmetry allowed for the Ia3d cubic structure, indicating that the carbon molecular sieve is rearranged from an Ia3d cubic structure to a different structure. Element analysis shows that the carbon framework constituting the carbon molecular sieve can be represented by $C_{12}HO$ upon treatment at 900° C. and by $C_{16}HO$ upon treatment at 1,100° C. Also, the peaks read at 1350 and 1590 $cm^{-1}$ in Raman spectra show that the structure of the carbon framework is amorphous. It is, however, believed that the carbon framework may be crystallized by controlling the treatment temperature. The carbon molecular sieves according to the present invention show X-ray diffraction patterns at a diffraction angle of 5° or less and are uniform in pore size with structural regularity.

Figure 4:
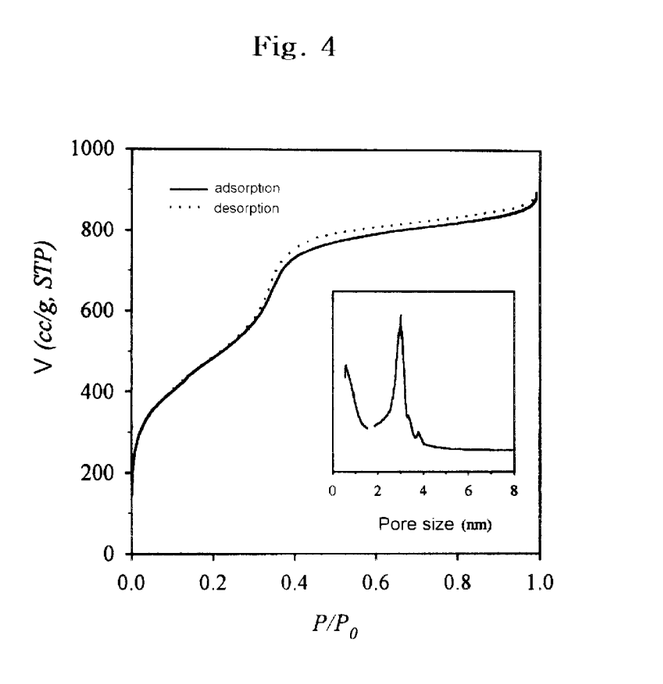
FIG. 4 shows argon adsorption-desorption isotherms of CMK-1 synthesized by use of MCM-48 as a template, with a pore size distribution curve for CMK-1 obtained by the Horvarth-Kawazoe method and the Barrett-Joyner-Halenda (BJH) method.

From the data of the argon adsorption-desorption curve and pore size distribution diagram of FIG. 4, it is apparent that CMK-1 possesses a small portion of micropores and a majority of mesopores which are uniformly about 3.0 nm in size. In addition, CMK-1 is characterized by a BET adsorption area of 1380 $cm^{-1}$ and a pore volume of 1.06 $cm^3$. MCM-48 templates different in pore size, even if they have a Ia3d cubic structure, allow the synthesis of CMK-1 different in pore size.

Besides MCM-48, various three-dimensional structures of mesoporous molecular sieves can be used as templates in synthesizing CMK. For instance, SBA-1 being of a Pm3n cubic structure, is used to synthesize CMK-2, whose spectral characteristics are found in the X-ray diffraction patterns of FIG. 5.

CMK materials can find various applications in supports for catalytically active materials, catalysts, adsorbents of organic materials, sensors, electrode materials, etc. When used as a catalyst support, CMK-1 enhances excellent catalytic activity. For example, after being impregnated at amounts of 2% and 5% into CMK-1, platinum is subjected to reduction under vacuum to form platinum clusters. When these platinum clusters were used for hydrogen adsorption, results were obtained as shown in Table 1, below. As apparent, the platinum clusters can be formed at a size as small as about 2 nm on CMK-1 and the platinum-impregnated CMK-1 is very useful as a catalyst for the reaction of hydrophobic organic compounds, such as hydrogen addition and reduction.

TABLE 1

Hydrogen Adsorption of Platinum Clusters on CMK-1

| Samples | H/Pt |
|---|---|
| 2 wt % Pt/CMK-1 | 1.0 |
| 5 wt % Pt/CMK-1 | 0.8 |

A better understanding of the present invention may be obtained in light of the following examples which are set forth to illustrate, but are not to be construed to limit, the present invention.

PREPARATION EXAMPLE I

Preparation of MCM-48

Based on the teaching disclosed in Chem. Commun., 1998, p 259 by Kim et al., the preparation of MCM-48 was performed as follows.

A solution of 12.3 g of ethanol in 105.2 g of water was mixed with 15.8 g of hexadecyltrimethyl ammonium bromide (HTABr) to give Solution A. Separately, 9.4 g of Ludox HS40 (trade name of DuPont, colloid silica) was mixed with 33 g of an aqueous 1.0 M sodium hydroxide solution and heated at 80° C. for 2 hours to give Solution B. Solution A and Solution B were mixed with each other by dropwise addition of Solution B for 1 hour at room temperature while vigorously stirring Solution A in a polypropylene bottle with a magnetic bar. In this mixture, the mole ratio of $SiO_2$ to HTABr was 1:0.7 with $SiO_2:Na_2O:ethane:H_2O=1:0.25:3.5:100$. The resultant mixture was subjected to reaction at 100° C. for four days. The precipitate thus obtained was filtered off, washed with 2° distilled water and dried at 100° C.

PREPARATION II

Preparation of MCM-48

Preparation of MCM-48 was achieved in a method developed by the present inventors as follows.

3.5 g of hexadecyltrimethylammonium (HTABr) and 0.84 g of LE-4 ($C_{12}H_{25}O(CH_2CH_2O)_4H$) was mixed with 40.4 g of water to give Solution A. Separately, 9.4 g of Ludox HS40 (trade name of DuPont, colloid silica) was mixed with 31 g of an aqueous 1.0 M sodium hydroxide solution and heated at 80° C. for 2 hours to give Solution B. Solution A and Solution B were mixed with each other by dropwise addition of Solution B for 1 hour at room temperature while vigorously stirring Solution A in a polypropylene bottle with a magnetic bar. In this mixture, the mole ratio of HTABr to LE-4 was 0.81: 0.19 with $HTABr:SiO_2:Na_2O:H_2O=0.81:5:1.25:400$. The resultant mixture was subjected to reaction at 100° C. for two days, cooled to room temperature and neutralized to 10 in pH with an aqueous 30 wt % acetic acid solution. The same reaction, cooling and neutralization procedure was repeated twice more. The precipitate thus obtained was filtered off, washed with 2° doubly distilled water and dried at 100° C.

PREPARATION EXAMPLE III

Preparation of SBA-1

Based on the teaching disclosed in Chem. Mater. Vol. 11, p 487 by Kim and Ryoo, the preparation of SBA-1 was conducted as follows.

0.59 g of hexadecylethylammonium bromide (HTEABr) was dissolved in 100 ml of an aqueous 4.08 M hydrochloric acid (HCl) to give Solution A. While being stirred in ice water, Solution A was cooled to 0° C. and then, added with 1.55 g of tetraethyl orthosilicate (TEOS). In the reaction mixture, the molar ratio of $HTEABr:TEOS:HCl:H_2O$ was 1:5 280:3,500. After further stirred at 0° C. for an additional 2 hours, the reaction mixture was heated to 100° C. under reflux and allowed to react for one hour. The precipitate thus formed was quickly dried in a hot state with the aid of an aspirator. This aspiration was conducted for 30 min so that the hydrochloric acid was removed to a substantial degree. Finally, the precipitate was completely dried in an oven maintained at 140° C.

PREPARATION EXAMPLE IV

Metal Impregnation for the Preparation of Aluminum-Substituted Mesoporous Molecular Sieves Based on the teaching disclosed in Chem. Commun., 1999, p 2225 by Ryoo et al., impregnation of aluminum into frameworks of mesoporous molecular sieves MCM-41, MCM-48, SBA-1, KIT-1 and MSU-1 was achieved as follows.

To remove surfactants present within pure silica frameworks of preexisting mesoporous molecular sieves, they were washed with an ethanol-hydrochloride mixture solution. The surfactant-removed mesoporous molecular sieves were immersed in a solution of anhydrous aluminum chloride ($AlCl_3$) in 50 ml of absolute ethanol and stirred at room temperature. After one hour of the stirring, the samples were filtered, washed cleanly with absolute ethanol, and dried at 140° C. In the air, the dried samples were calcined at 550° C. for five hours.

EXAMPLE I

While the MCM-48 prepared in Preparation Example I served as a template, carbon molecular sieves CMK-1 were prepared from various amounts of sucrose. For this, first an aqueous sucrose solution was added with sulfuric acid, as indicated in Table 2, below, to give Solution A. Values given in Table 2 were quantities per g of MCM-48. The calcined MCM-48 was put in Solution A, which was dried and polymerized by slowly heating to 145° C. This sample was treated at 200° C. under vacuum to remove the sulfuric acid and water remaining unreated in pores of MCM-48. After being put in Solution B which was prepared by adding sulfuric acid in an aqueous sucrose solution, the sample was subjected to the same drying and polymerization as in above, followed by thermal decomposition at 900° C. under vacuum. The composition of Solution B is given in Table 3, below. Following this carbonization, the MCM-48 silica framework, serving as a template, was removed using an aqueous 1 M NaOH solution and a small amount of ethanol. CMK-1 thus obtained was analyzed in X-ray diffraction patterns which are shown in FIG. 3.

TABLE 2

| Composition of Solution A | | |
|---|---|---|
| Sucrose Sol'n (wt %) | Sucrose Sol'n (g) | Sulfuric acid (ml) |
| 18.1 | 6.9 | 0.15 |

TABLE 3

| Composition of Solution B | | |
|---|---|---|
| Sucrose Sol'n (wt %) | Sucrose Sol'n (g) | Sulfuric acid (ml) |
| 11.7 | 6.4 | 0.15 |
| 15.0 | 6.6 | 0.15 |
| 18.1 | 6.9 | 0.15 |

EXAMPLE II

Figure 5:
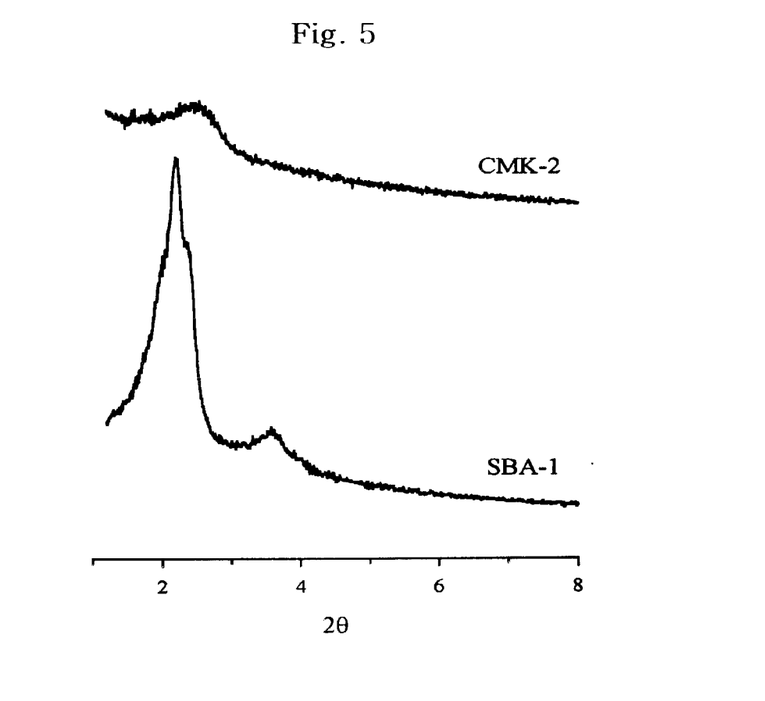
FIG. 5 shows X-ray diffraction patterns of the mesoporous molecular sieve SBA-1 and the CMK-2 synthesized by use of SBA-1 as a template.

While the SBA-1 prepared in Preparation Example III served as a template, carbon molecular sieves CMK-2 were prepared from various amounts of sucrose. For this, first, a sucrose solution was added with sulfuric acid to give Solution A. The calcined SBA-1 was put in Solution A, which was dried and polymerized by slowly heating to 145° C. This sample was treated at 200° C. under vacuum to remove the sulfuric acid and water remaining unreated in pores of SBA-1. After being put in Solution B which was prepared by adding sulfuric acid in an aqueous sucrose solution, the sample was subjected to the same drying and polymerization as in above, followed by thermal decomposition at 900° C. under vacuum. The compositions of Solutions A and B are the same as in Example I. Following this carbonization, the SBA-1 silica framework, serving as a template, was removed using an aqueous 1 M NaOH solution and a small amount of ethanol. CMK-2 thus obtained was analyzed in X-ray diffraction patterns which are shown in FIG. 5.

EXAMPLE III

Figure 6:
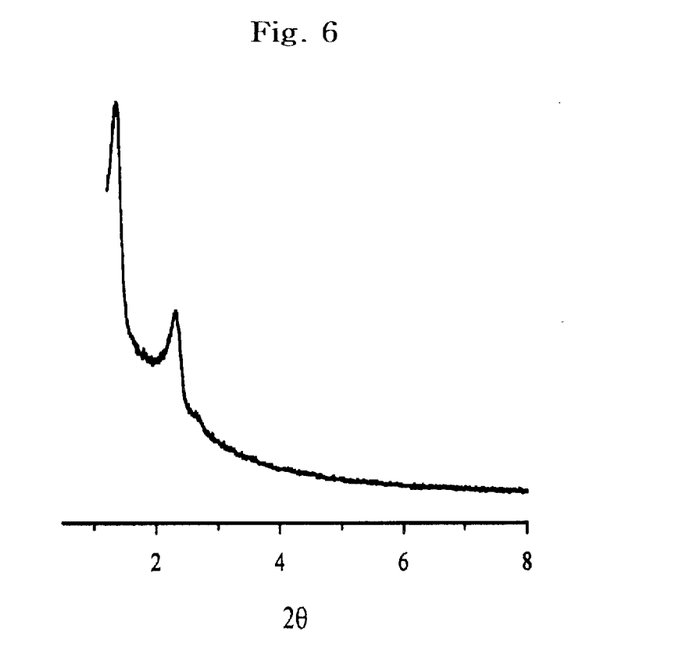
FIG. 6 shows an X-ray diffraction pattern of CMK-1 synthesized from furfuryl alcohol by use of aluminum-substituted MCM-48 as a template.

While an Al-substituted MCM-48 served as a template, carbon molecular sieves CMK-1 were prepared from furfuryl alcohol. Into the AlMCM-48, which was prepared by impregnating MCM-48 with aluminum as in Preparation Example IV, furfuryl alcohol was adsorbed at an amount of 1 g per g of ALMCM-48 at room temperature, after which furfuryl alcohol was polymerized at 140° C. for 24 hours in a nitrogen atmosphere. Then, thermal decomposition was performed at 900° C. in a vacuum atmosphere, followed by removing the AlMCM-48 silica framework with an aqueous 1 M NaOH solution and a small amount of ethanol. CMK-1 thus obtained was analyzed in X-ray diffraction patterns which are shown in FIG. 6.

EXAMPLE IV

Figure 7:
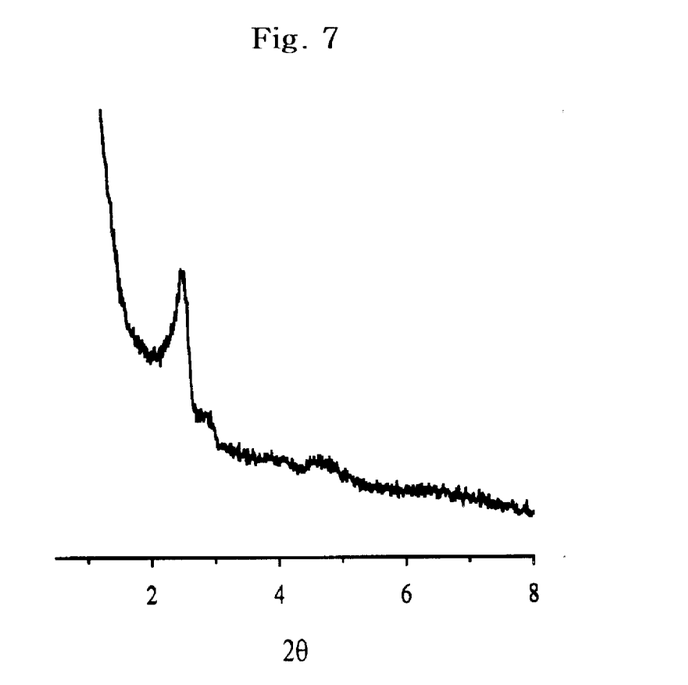
FIG. 7 shows an X-ray diffraction pattern of CMK-1 synthesized from acetylene gas by use of aluminum-substituted MCM-48 as a template.

Carbon molecular sieves CMK-1 were prepared from acetylene gas with an Al-substituted MCM-48 serving as a template. The AlMCM-48, prepared by impregnating MCM-48 with aluminum as in Preparation Example IV, was treated at 400° C. under vacuum, after which acetylene gas was sufficiently adsorbed into the AlMCM-48 while being polymerized. Following the polymerization, thermal decomposition was carried out at 900° C. under vacuum and the AlMCM-48 silica framework, serving as a template, was removed using an aqueous 1 M NaOH solution and a small amount of ethanol. CMK-1 thus obtained was analyzed in X-ray diffraction patterns which are shown in FIG. 7.

EXAMPLE V

Carbon molecular sieves CMK-1 different in pore size were prepared from sucrose with MCM-48 materials of different framework thickness serving as templates.

Figure 8:
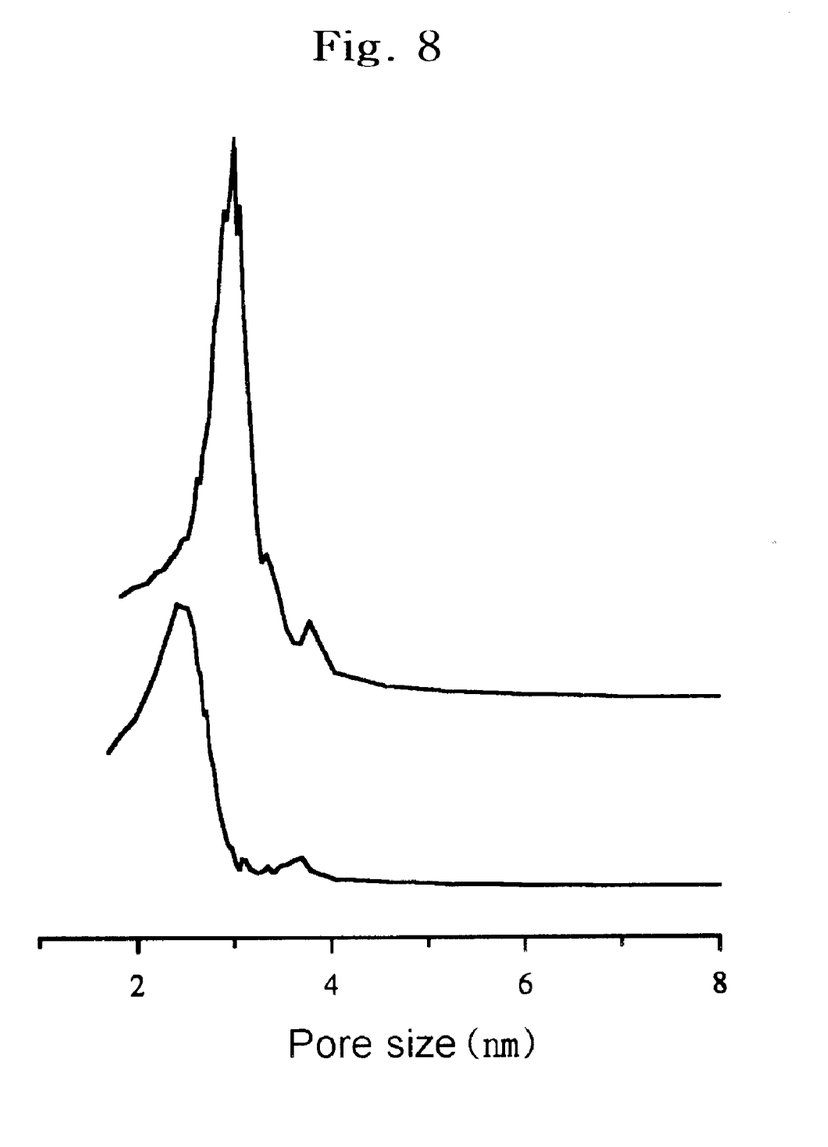
FIG. 8 shows pore size distribution curves for CMK-1 samples using as templates MCM-48 materials with different pore sizes, obtained by means of the BJH method.

To this end, the MCM-48 materials which were prepared and calcined as described in Preparation Examples I and II were used as templates. The other procedures necessary for the preparation of CMK-1 were carried out as in Example I. The sieves CMK-1 were found to be different in pore size as measured by the BJH method. The results are shown in FIG. 8.

As described hereinbefore, structurally regular carbon molecular sieves with uniform pore sizes can be synthesized with mesoporous molecular sieves serving as templates in accordance with the present invention. The uniformity in pore size and regularity in structure make the carbon molecular sieves find numerous applications in catalysts, adsorbents, carriers, sensors, electrodes, etc.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A method for preparing a carbon molecular sieve material comprising the steps of:
   a) adsorbing into the pores of an inorganic molecular sieve material selected from the group consisting of MCM-48, SBA-1, KIT-1, SBA-15 and MSU-1, a starting material selected from the group consisting of:
      (i) a polymer precursor; and
      (ii) a mixture of an aqueous carbohydrate solution and an acid; wherein said inorganic molecular sieve material is the solid acid form thereof when the selected starting material comprises a polymer precursor;
   b) drying and polymerizing the adsorbates;
   c) optionally repeating the steps of adsorbing, drying and polymerizing;
   d) carbonizing the polymerized adsorbates by thermal decomposition; and
   e) removing the framework of the inorganic molecular sieve from the carbonized adsorbates of the sieve material by treating the sieve material with a solution of hydrofluoric acid or sodium hydroxide.

2. The method as set forth in claim 1, wherein the carbohydrate is selected from the group consisting of sucrose, xylose and glucose and the polymer precursor is selected from the group consisting of furfuryl alcohol, aniline, acetylene and propylene.

3. The method as set forth in claim 1, wherein the molecular sieve material comprises a structure in which channels are three-dimensionally arranged or one-dimensional channels are connected to each other via micropores.

4. The method as set forth in claim 1, further comprising the step of: f) impregnating a transition metal into pores of the carbon molecular sieve material.

5. The method as set forth in claim 4, wherein the transition metal is selected from the group consisting of platinum, gold, palladium, ruthenium, molybdenum and combinations thereof.

6. The method as set forth in claim 1, wherein the carbon molecular sieve material has an X-ray diffraction pattern at a diffraction angle of 5° or less, and has a regular structure with uniform pore sizes.

7. The method as set forth in claim 1, wherein the thermal decomposition is performed in the temperature range of 500 to 1,200° C. for 1 to 12 hours under vacuum or oxygen-free atmosphere, wherein the temperature is increased to this range over a period of 1 to 12 hours.

8. The method as set forth in claim 1, wherein the carbohydrate or the polymer precursor is adsorbed into the inorganic sieve material in an amount in the range of 0.1 to 3 g, per gram of inorganic molecular sieve material.

9. The method as set forth in claim 1, wherein the solid acid form is an aluminum-substituted inorganic molecular sieve.

10. The method as set forth in claim 1, wherein the acid is selected from sulfuric acid, hydrochloric acid, nitric acid and phosphoric acid.

11. The method as set forth in claim 1, wherein the drying and polymerizing step is performed in the temperature range of 50 to 400° C., wherein the temperature is raised to this range over a period of 5 minutes to 24 hours.

* * * * *